US012732781B2

(12) United States Patent
Lei

(10) Patent No.: US 12,732,781 B2
(45) Date of Patent: Sep. 8, 2026

(54) COMMUNICATION METHOD AND APPARATUS FOR MULTICAST AND BROADCAST SERVICE, MEDIUM, AND ELECTRONIC DEVICE

(71) Applicant: Tencent Technology (Shenzhen) Company Limited, Shenzhen (CN)

(72) Inventor: Yixue Lei, Shenzhen (CN)

(73) Assignee: TENCENT TECHNOLOGY (SHENZHEN) COMPANY LIMITED, Shenzhen (CN)

(*) Notice: Subject to any disclaimer, the term of this patent is extended or adjusted under 35 U.S.C. 154(b) by 492 days.

(21) Appl. No.: 18/232,771

(22) Filed: Aug. 10, 2023

(65) Prior Publication Data

US 2023/0388754 A1 Nov. 30, 2023

Related U.S. Application Data

(63) Continuation of application No. PCT/CN2022/095096, filed on May 26, 2022.

(30) Foreign Application Priority Data

Jul. 1, 2021 (CN) ......................... 202110750883.8

(51) Int. Cl.
*H04W 4/06* (2009.01)
*H04W 72/30* (2023.01)

(52) U.S. Cl.
CPC ............ *H04W 4/06* (2013.01); *H04W 72/30* (2023.01)

(58) Field of Classification Search
CPC ....... H04W 4/06; H04W 72/30; H04W 76/40; H04W 24/02; H04L 12/189; H04L 51/58;
(Continued)

(56) References Cited

U.S. PATENT DOCUMENTS

2023/0199436 A1* 6/2023 Duan ...................... H04W 4/06 370/312
2023/0199894 A1* 6/2023 Shi ...................... H04L 12/1836 370/329

(Continued)

FOREIGN PATENT DOCUMENTS

CN 110972078 A 4/2020
CN 112136294 A 12/2020

(Continued)

OTHER PUBLICATIONS

Ericsson et al., "Update [7.3] to Add New Clause for MBS Session Delivery Status Notification for Broadcast", SA WG2 Meeting #144E, S2-2103547, Apr. 12-16, Electronic, Elbonia, Apr. 19, 2021, 2 pgs.

(Continued)

*Primary Examiner* — Austin J Moreau
(74) *Attorney, Agent, or Firm* — Morgan, Lewis & Bockius LLP

(57) ABSTRACT

Embodiments of this application provide a communication method for a multicast and broadcast service performed by an electronic device. The method includes: performing communication negotiation of a Multicast and Broadcast Service (MBS) service with a core network element, to determine a transmission policy of MBS service status indication information; receiving, based on the transmission policy, the MBS service status indication information transmitted by the core network element; and transmitting MBS service data matching the MBS service status indication information to the core network element, wherein the core network element transmits the MBS service data to a terminal device.

17 Claims, 7 Drawing Sheets

(58) Field of Classification Search
CPC ... H04L 65/611; H04L 65/80; H04N 21/6131; H04N 21/6405
See application file for complete search history.

(56) References Cited

U.S. PATENT DOCUMENTS

| | | | | |
|---|---|---|---|---|
| 2023/0345310 | A1* | 10/2023 | Li | H04W 4/06 |
| 2023/0353986 | A1* | 11/2023 | Mohammed Mikaeil | H04W 72/30 |

FOREIGN PATENT DOCUMENTS

| | | | |
|---|---|---|---|
| CN | 112437122 | A | 3/2021 |
| CN | 113490155 | A | 10/2021 |

OTHER PUBLICATIONS

Tencent Technology, ISR, PCT/CN2022/095096, Aug. 2, 2022, 3 pgs.
Tencent, MBS Functional Entities Clarification, SA WG2 Meeting #144E, S2-2102450, Elbonia, Apr. 12-16, 2021, 4 pgs.
Vivo, "AF Authorization for Multicast and Broadcast", SA WG2 Meeting #S2-144E, S2-2102666, Apr. 12-16, 2021, Elbonia, Apr. 6, 2021, 2 pgs.
Tencent Technology, Extended European Search Report, EP Patent Application No. 22831536.2. Jun. 28, 2024, 10 pgs.
Tencent Technology, WO, PCT/CN2022/095096, Aug. 2, 2022, 5 pgs.
Tencent Technology, IPRP, PCT/CN2022/095096, Dec. 14, 2023, 6 pgs.

* cited by examiner

COMMUNICATION METHOD AND APPARATUS FOR MULTICAST AND BROADCAST SERVICE, MEDIUM, AND ELECTRONIC DEVICE

CROSS-REFERENCE TO RELATED APPLICATIONS

This application is a continuation application of PCT Patent Application No. PCT/CN2022/095096, entitled "COMMUNICATION METHOD AND APPARATUS FOR MULTICAST AND BROADCAST SERVICE, MEDIUM, AND ELECTRONIC DEVICE" filed on May 26, 2022, which claims priority to Chinese Patent Application No. 202110750883.8 entitled "COMMUNICATION METHOD AND APPARATUS FOR MULTICAST AND BROADCAST SERVICE, MEDIUM, AND ELECTRONIC DEVICE" and filed with the National Intellectual Property Administration, PRC on Jul. 1, 2021, all of which is incorporated herein by reference in its entirety.

FIELD OF THE TECHNOLOGY

This application relates to the field of computer and communication technologies, and specifically, to a communication method, an apparatus, a medium and an electronic device for multicast and broadcast service.

BACKGROUND OF THE DISCLOSURE

An MBS (Multicast and Broadcast Service) service includes a multicast service and a broadcast service, which specifically, transmit the same content to multiple receivers. Using the broadcast service as an example, in order to reduce the terminal energy consumption and the network deployment cost, in a one-way broadcast service scenario, a network side may simultaneously broadcast service content such as TV programs or live events to a large number of terminal devices.

In this service scenario, content generated by an AF (Application Function) be transmitted directly to the network side.

SUMMARY

Embodiments of this application provide a communication method and apparatus for a multicast and broadcast service, a medium, and an electronic device, to avoid at least to some extent the problem of invalid service data transmission caused by blindly transmitting MBS service data to a network side, thereby improving the transmission efficiency of the MBS service data.

Other features and advantages of this application become obvious through the following detailed descriptions, or may be partially learned partially through the practice of this application.

According to an aspect of the embodiments of this application, a communication method for a multicast and broadcast service is performed by an electronic device acting as an Application Function (AF) entity, including:

performing communication negotiation of an MBS service with a core network element, to determine a transmission policy of MBS service status indication information;

receiving, based on the transmission policy, the MBS service status indication information transmitted by the core network element; and transmitting MBS service data matching the MBS service status indication information to the core network element, so that the core network element transmits the MBS service data to a terminal device.

According to an aspect of the embodiments of this application, a non-transitory computer-readable medium is provided, storing one or more programs, the one or more programs, when executed by one or more processors of an electronic device, causing the electronic device to implement the communication method for a multicast and broadcast service according to the embodiments of this application.

According to an aspect of the embodiments of this application, an electronic device is provided, including: one or more processors; and a storage apparatus, configured to store one or more programs, the one or more programs, when executed by the one or more processors, causing the electronic device to implement the communication method for a multicast and broadcast service according to the embodiments of this application.

In the technical solutions provided by some embodiments of this application, the AF performs communication negotiation of the MBS service with the core network element to determine the transmission policy of the MBS service status indication information, then receives, based on the transmission policy, the MBS service status indication information transmitted by the core network element, and transmits the MBS service data matching the MBS service status indication information to the core network element according to the MBS service status indication information. Therefore, the AF can obtain related information of an MBS service status from a core network side, and accordingly transmit the matching MBS service data to the core network element, to avoid the problem of invalid service data transmission caused by the AF blindly transmitting the MBS service data to the core network element, thereby improving the transmission efficiency of the MBS service data.

The foregoing general descriptions and the following detailed descriptions are merely for illustration and explanation purposes and are not intended to limit this application.

BRIEF DESCRIPTION OF THE DRAWINGS

The accompanying drawings herein, which are incorporated into the specification and constitute a part of this specification, show embodiments that conform to this application, and are used for describing a principle of this application together with this specification. Apparently, the accompanying drawings in the following description show merely some embodiments of this application, and a person of ordinary skill in the art may still derive other drawings from these accompanying drawings without creative efforts. In the accompanying drawings:

FIG. 8 is a flowchart of transmitting network status information to an AF according to some embodiments of this application.

DESCRIPTION OF EMBODIMENTS

Exemplary implementations are now described t more comprehensively with reference to the accompanying drawings. However, the exemplary implementations can be implemented in various forms, and are not to be understood as being limited to the examples. Conversely, the implementations are provided to make this application more comprehensive and complete, and comprehensively convey the idea of the examples of the implementations to a person skilled in the art.

In addition, the described features, structures, or characteristics may be combined in one or more embodiments in any appropriate manner. In the following descriptions, many specific details are provided to provide a comprehensible understanding of the embodiments of this application. However, a person skilled in the art is to be aware that, the technical solutions in this application may be implemented, one or more of the specific details may be omitted, or another method, element, apparatus, or step may be used.

The block diagrams shown in the accompany drawing are merely functional entities and do not necessarily correspond to physically independent entities. To be specific, such functional entities may be implemented in the form of software, or implemented in one or more hardware modules or integrated circuits, or implemented in different networks and/or processor apparatuses and/or micro controller apparatuses.

The flowcharts shown in the accompanying drawings are merely examples for descriptions, do not need to include all contents and operations/steps, and do not need to be performed in the described orders either. For example, some operations/steps may be further divided, while some operations/steps may be combined or partially combined. Therefore, an actual execution order may change according to an actual case.

"Plurality of" mentioned herein means two or more. "And/or" describes an association relationship for describing associated objects and represents that three relationships may exist. For example, A and/or B may represent the following three cases: Only A exists, both A and B exist, and only B exists. A character "/" generally indicates an "or" relationship between the associated objects.

Figures 1, 2:
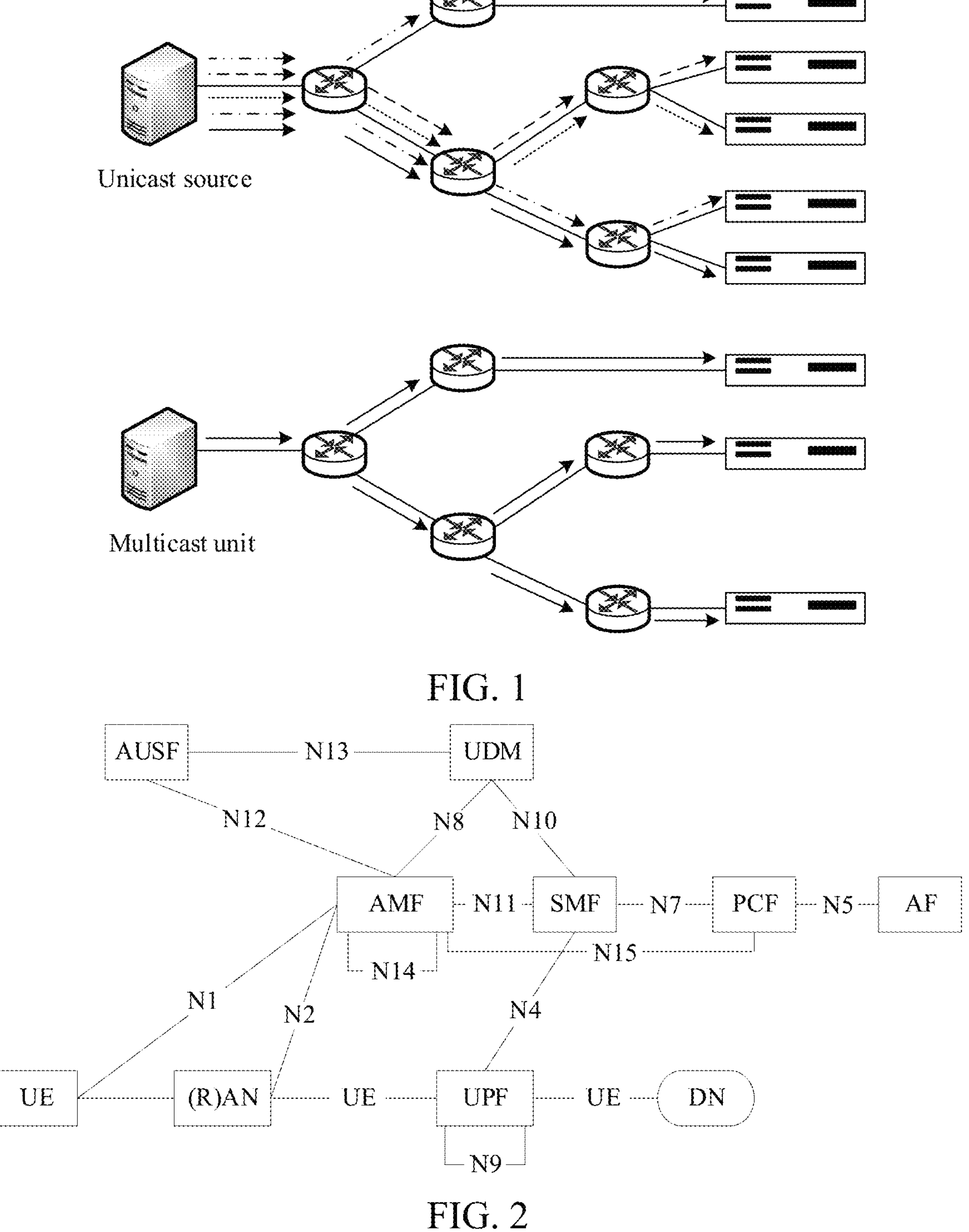
FIG. 1 is a schematic flowchart of data transmission of a unicast communication system and a multicast communication system according to some embodiments of this application.
FIG. 2 is a schematic diagram of a 5G architecture according to some embodiments of this application.

Communication manners between network nodes mainly include unicast, multicast, and broadcast. The "unicast" is the most common one-to-one communication. The advantage is that the transmitter may transmit different content to different receivers. However, if the transmitter needs to transmit the same content to multiple receivers, multiple copies of the same data need to be transmitted end to end, causing low efficiency. Specifically, as shown in FIG. 1, when a unicast source transmits data to multiple receivers in a unicast manner, multiple copies of the same data need to be transmitted end to end (different line types in FIG. 1 represent different data flows).

The "multicast" is that a transmitter transmits the same content to multiple receivers. Online video conferencing and online video on demand are especially suitable for the multicast manner. Because if the unicast manner is adopted, there are as many transmission processes as there are the receivers. This is obviously extremely inefficient; However, if the broadcast manner that does not distinguish between targets and transmits all is adopted, although the data can be transmitted at one time, specific data receivers cannot be distinguished. As can be seen, by adopting the multicast manner, it is possible to transmit the same data to multiple receivers at one time, or to only transmit data to specific objects. Specifically, as shown in FIG. 1, the multicast source may transmit the same data to multiple receivers at one time.

The "broadcast" is also transmitting the same content to multiple receivers. However, no selection is made on receivers during transmission. Therefore, data may be transmitted to unnecessary devices, resulting in a waste of network resources. In addition, some receivers may not be "interested" in the broadcast content. Therefore, after receiving the broadcast content, the receivers have to discard the received data packets, causing a waste of terminal resources.

A fundamental difference between the broadcast service and the multicast service is that all UEs (User Equipment) in the system can participate in the broadcast service without signing a contract, while UE of the multicast service needs to sign a contract and be authenticated before participating. There are many types of multicast services and broadcast services. For the multicast services, the UE is to join a multicast group of corresponding services through IP multicast addresses. Broadcast services corresponding to one broadcast group have their specific service areas.

FIG. 2 is a 5G network architecture defined by the 3GPP (The 3rd Generation Partnership Project) organization, where an AMF (Access and Mobility Management Function), an SMF (Session Management Function), a UPF (User Plane Function), a PCF (Policy Control Function), an AUSF (Authentication Server Function), a UDM (Unified Data Management) and the like are core network elements of a 5G network. An AF is an AF entity located outside of a 5G core network. The UE may be a 5G terminal such as a mobile phone or a tablet computer. A (R)AN ((Radio) Access Network) may be a 5G base station. A DN (Data Network) is a service server accessed by the UE.

Still referring to FIG. 2, in a 5G core network element, the AMF is responsible for terminating an N2 interface of a control surface of a base station. The AMF is also responsible for terminating an N1 interface of the UE, to implement NAS (Non-Access Stratum) encryption and integrity protection. It is also responsible for functions such as UE access verification, authorization management, registration, connection, and reachability and mobility management, and is responsible for transparent transmission of session management messages between the UE and the SMF.

In addition, referring to FIG. 2, the (R)AN and the UPF interact through an N3 interface. The UPF and the UPF may interact through an N9 interface. The UPF and the SMF interact through an N4 interface. The UPF and the SMF interact through an N6 interface. The SMF and the AMF interact through an N11 interface. The SMF and the PCF interact through an N7 interface. The SMF and the UDM interact through an N10 interface. The PCF and the AF interact through an N5 interface. The AMF and the AMF may interact through an N14 interface. The AMF and the PCF interact through an N15 interface. The AMF and the UDM interact through a N8 interface; The AMF and the AUSF interact through an N12 interface. The AUSF and the UDM interact through an N13 interface.

However, the system architecture shown in FIG. 2 only supports the unicast service, and does not support the 5G broadcast and multicast service. In order to support the 5G broadcast and multicast service, a system architecture shown in FIG. 3 is introduced.

Figure 3:
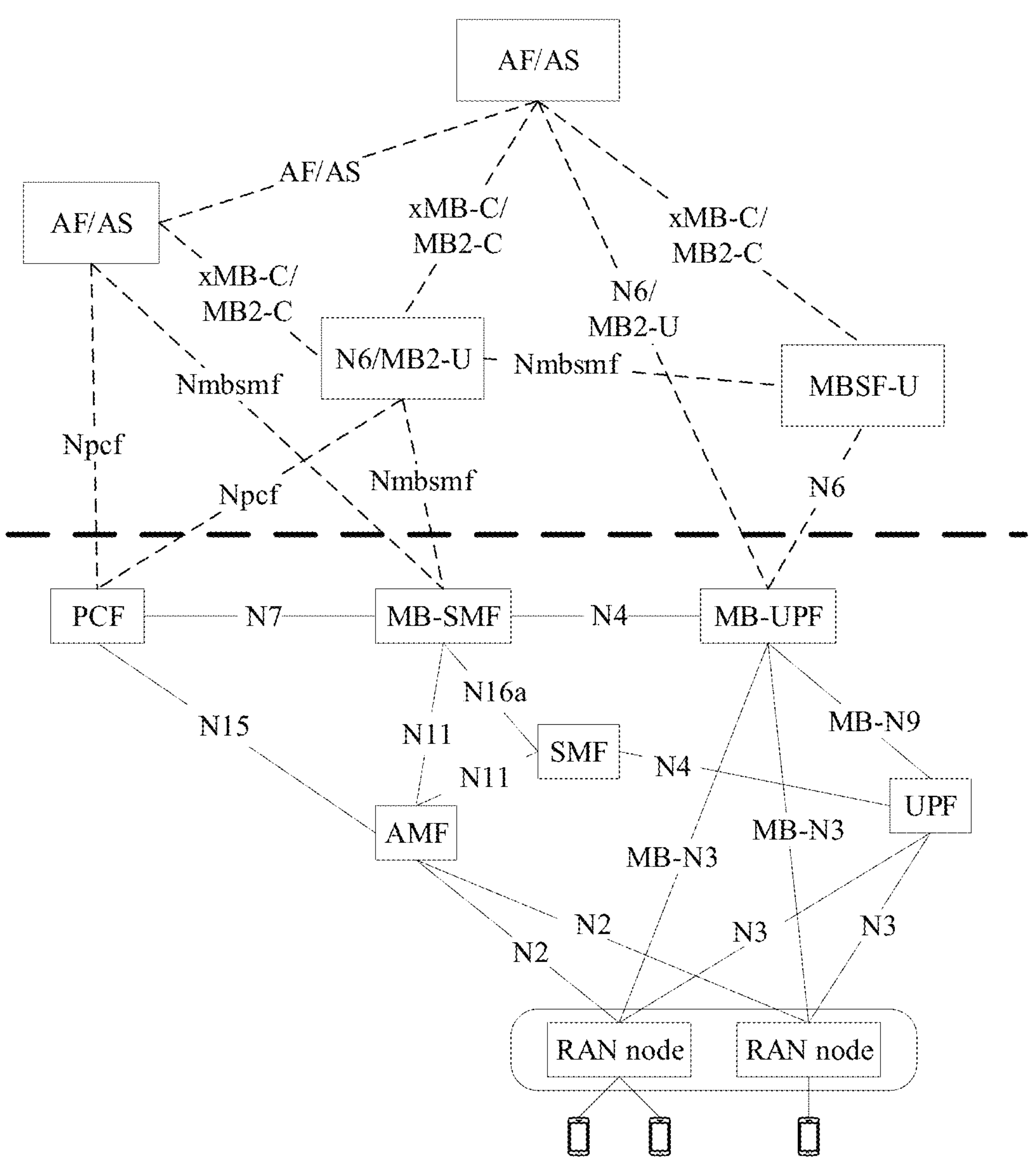
FIG. 3 is a schematic diagram of a 5G architecture supporting an MBS service according to some embodiments of this application.

The system architecture in FIG. 3 includes an AF/AS (Application Server), an NEF (Network Exposure Function), an MBSF-C (Multicast/Broadcast Service Function-Control Plane), an MBSF-U (Multicast/Broadcast Service Function-User Plane), a PCF, an MB-SMF (Multicast/Broadcast-SMF), an MB-UPF (Multicast/Broadcast-UPF), an SMF, an AMF, a UPF, and a RAN node and UE connected to the RAN node.

Compared with the basic architecture in FIG. 2, the system architecture shown in FIG. 3 introduces new network elements an MB-SMF and an MB-UPF dedicated to supporting the 5G broadcast service and the multicast service. In addition, the PCF, the AMF, the NEF and the RAN devices all need to introduce new function enhancements to provide the 5G multicast and broadcast service.

In the system architecture shown in FIG. 3, an Npcf refers to an interface for the PCF to provide services. Other NFs (Network Functions) transmit Npcf service request messages to the PCF through this interface, and the PCF replies to the requests and transmits notification service messages through this interface; An Nmbsmf refers to an interface for the MB-SMF to provide services. Other NFs transmit Nmbsmf service request messages to the MB-SMF through this interface, and the MB-SMF replies to the requests and transmits notification service messages through this interface.

In addition, the AMF and the RAN node interact through the N2 interface. The UPF and the RAN node interact through the N3 interface. The SMF and the UPF interact through the N4 interface. The SMF and the AMF interact through the N11 interface. The MB-UPF and the RAN node interact through an MB-N3 interface. The MB-SMF and the AMF interact through the N11 interface. The AMF and the UDM interact through an N16a interface. The PCF and the AMF interact through the N15 interface. The PCF and the MB-SMF interact through the N7 interface. The MB-SMF and the MB-UPF interact through the N4 interface. The MB-UPF and the MBSF-U interact through the N6 interface. The MB-UPF and the AF/AS interact through an N6/MB2-U interface. The MBSF-U and the AF/AS interact through an xMB-U/MB2-U interface. The MBSF-C and the AF/AS interact through an xMB-C/MB2-C interface. The MBSF-C and the NEF interact through an xMB-C/MB2-C interface. The NEF and the AF/AS interact through an N33 interface.

In the system architecture shown in FIG. 3, the MBSF-C and the MBSF-U are not necessary. However, under the following two conditions, the MBSF-C and the MBSF-U are necessary: 1. When services of a 5G MBS and a 4G or 3G MBMS (Multimedia Broadcast and Multicast Service) are interconnected, that is, when a 5G AF and a 4G or 3G MBMS AS are the same entity; 2. When the operator needs to process an MBS service (such as transcoding videos or checking content).

In the related art, in order to reduce the terminal energy consumption and the network deployment cost, in a one-way broadcast service scenario, a network side may simultaneously broadcast service content such as TV programs or live events to a large number of UEs. In this service scenario, the 5G network itself does not increase the allocation of radio resources due to the increase in the number of UEs, causing extreme scalability. Therefore, in principle, content generated by the AF may transmitted directly to the 5G network. The AF does not need to perceive how the 5G network transmits a PDU (Protocol Data Unit) session to the UE. However, this network design principle also brings a new problem, that is, when transmits service data to the 5G network, the AF does not learn whether information exists in the session in the 5G network. This may cause the AF to have service data to transmit. However, the PDU session has been released or has not been established, resulting in a data transmission failure. In addition, the AF needs to transmit data. However, network connection and coverage problems exist in some areas of the 5G network, resulting in a poor user experience for some users. Such problems need to be resolved.

Therefore, the embodiments of this application provide a new communication solution for a multicast and broadcast service to resolve the problem of invalid service data transmission caused by AF blindly transmitting the MBS service data to the core network element. Implementation details of the technical solutions of the embodiments of this application are described below in detail.

Figures 4, 5, 6:
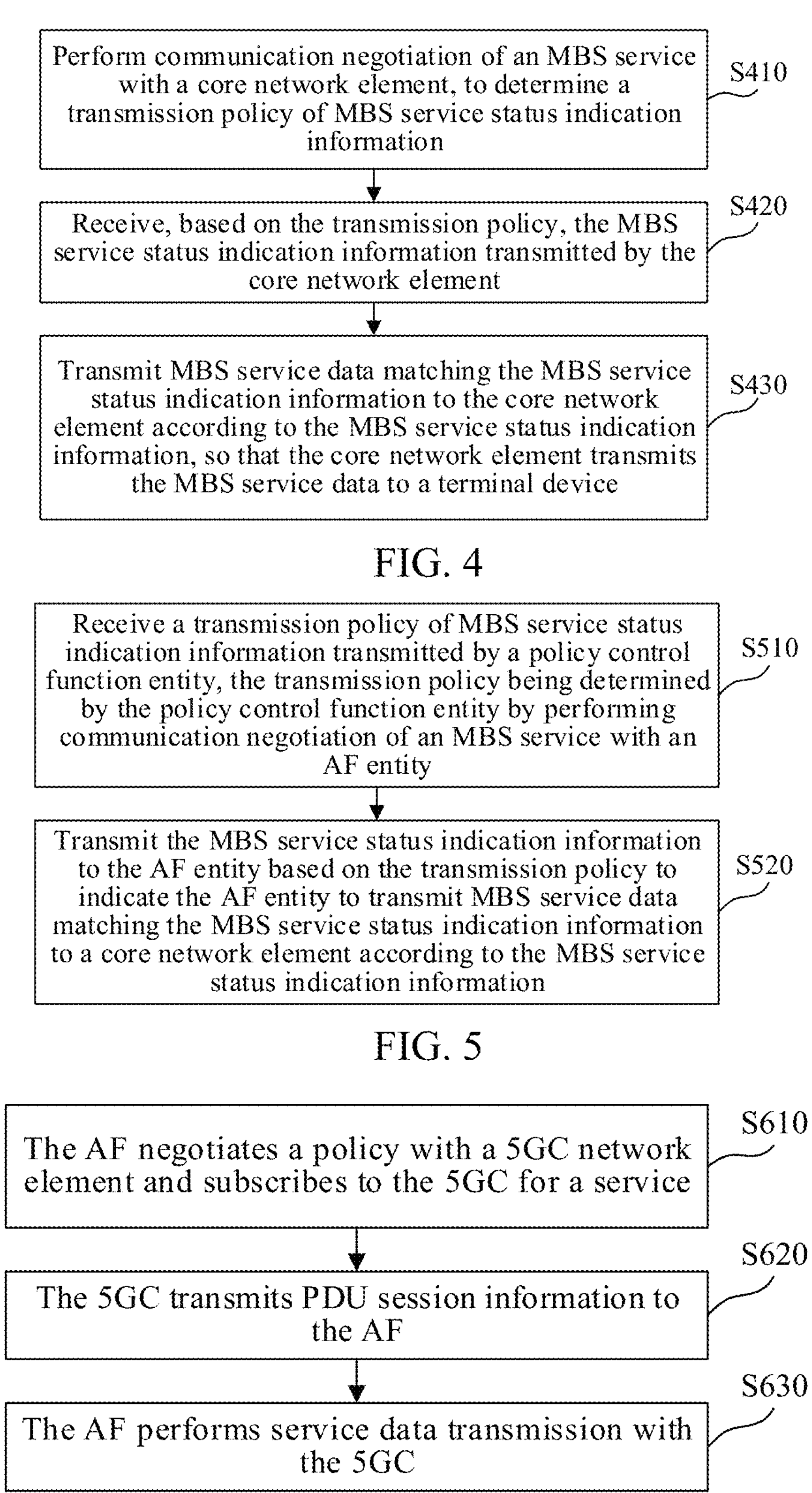
FIG. 4 is a flowchart of a communication method for a multicast and broadcast service according to some embodiments of this application.
FIG. 5 is a flowchart of a communication method for a multicast and broadcast service according to some embodiments of this application.
FIG. 6 is a flowchart of transmitting PDU session related status information to an AF according to some embodiments of this application.

FIG. 4 is a flowchart of a data transmission method for a multicast and broadcast service according to some embodiments of this application. The data transmission method for a multicast and broadcast service may be performed by an AF. Referring to FIG. 4, the communication method for a multicast and broadcast service includes at least step S410 to step S430. A detailed description is as follows:

Step S410: Perform communication negotiation of an MBS service with a core network element, to determine a transmission policy of MBS service status indication information.

In some embodiments of this application, the core network element may be a PCF. In this case, the AF may perform communication negotiation of the MBS service with the PCF through an NEF; Alternatively, when the AF is in a trusted network environment, the AF may directly perform communication negotiation of the MBS service with the PCF.

In some embodiments of this application, the transmission policy of the MBS service status indication information determined by the AF by negotiation with the PCF may include at least one of the following: an information type included in the MBS service status indication information, to-be-negotiated information content included in the MBS service status indication information, and a transmission frequency of the MBS service status indication information.

In some embodiments, the MBS service status indication information is used for indicating an MBS service status (including a transmission status and a processing status).

The transmission status, the processing status and the like of the MBS service may be learned according to the MBS service status indication information. The information type included in the MBS service status indication information refers to an information type indicated by the MBS service status indication information, such as a real-time status of a PDU session for processing the MBS service, or network status information related to the processing of the MBS service.

The to-be-negotiated information content included in the MBS service status indication information refers to specific content of the MBS service status indication information. For example, when the information type of the MBS service status indication information is the network status information related to the processing of the MBS service, the specific content of the negotiation may be one or more of physical layer broadcast resource information of an access network, an available bandwidth of a user plane function entity for processing the MBS service, and a transmission delay of the user plane function entity for processing the MBS service. When the information type of the MBS service status indication information is the real-time status of the PDU session for processing the MBS service, the specific content of the negotiation may be whether the PDU session is established or whether the PDU session is active.

The transmission frequency of the MBS service status indication information may be how often the MBS service status indication information is transmitted once, such as a transmission cycle of the MBS service status indication information.

Step S420: Receive, based on the transmission policy, the MBS service status indication information transmitted by the core network element.

In some embodiments of this application, the MBS service status indication information may be generated and transmitted by an SMF. In some embodiments, the SMF transmits the MBS service status indication information to the PCF, and then the MBS service status indication information is forwarded by the PCF to the AF through the NEF. Alternatively, after the SMF transmits the MBS service status indication information to the PCF, the PCF may directly transmit the MBS service status indication information to the AF.

In some embodiments of this application, after performing communication negotiation with the core network element, the AF may further transmit a subscription request for the MBS service status indication information to the core network element, to subscribe to the core network element for an MBS service status indication information service. Specifically, the AF may transmit the subscription request to the NEF. Then the subscription request is forwarded to the PCF by the NEF, and forwarded to the SMF by the PCF. Alternatively, the AF may transmit the subscription request directly to the PCF and the subscription request is forwarded to the SMF by the PCF.

In some embodiments, the AF may receive the MBS service status indication information transmitted by the core network element after receiving a subscription response returned by the core network element for the subscription request.

Still referring to FIG. 4, step S430: Transmit MBS service data matching the MBS service status indication information to the core network element according to the MBS service status indication information, so that the core network element transmits the MBS service data to a terminal device.

In some embodiments of this application, for example, if the MBS service status indication information indicates that the PDU session for processing the MBS service has been released or has not been established, the AF may suspend transmitting the MBS service data, to avoid continuing to transmit the MBS service data while the UE cannot receive the MBS service data, thereby avoiding the waste of transmission resources.

In some embodiments of this application, if the MBS service status indication information indicates that a network status related to the processing of the MBS service can meet a quality of service requirement of the MBS service, the MBS service data is transmitted normally. For example, if the physical layer broadcast resource information of the access network is sufficient for the transmission of the MBS service data, the available bandwidth of the user plane function entity for processing the MBS service is higher than the bandwidth required by the MBS service, or the transmission delay of the user plane function entity for processing the MBS service is lower than the delay required by the MBS service, it indicates that the network status related to the MBS service can meet the quality of service requirement of the MBS service.

In some embodiments of this application, if the MBS service status indication information indicates that the network status related to the processing of the MBS service cannot meet the quality of service requirement of the MBS service, the to-be-transmitted MBS service data is reduced. For example, if the physical layer broadcast resource information of the access network is less, the available bandwidth of the user plane function entity for processing the MBS service is less, or the transmission delay of the user plane function entity for processing the MBS service is higher, it indicates that the network status related to the MBS service cannot meet the quality of service requirement of the MBS service. In this case, the transmission of the MBS service data may be reduced.

The technical solutions of the embodiment shown in FIG. 4 is described from the perspective of the AF. The implementation details of the technical solutions of the embodiments of this application are described below with reference to FIG. 5 from the perspective of the core network element.

FIG. 5 is a flowchart of a communication method for a multicast and broadcast service according to some embodiments of this application. The communication method for a multicast and broadcast service may be performed by a core network element, and specifically may be performed by an SMF. Referring to FIG. 5, the communication method for a multicast and broadcast service includes at least step S510 to step S520. A detailed description is as follows:

Step S510: Receive a transmission policy of MBS service status indication information transmitted by a policy control function entity, the transmission policy being determined by the policy control function entity by performing communication negotiation of an MBS service with an AF entity.

In some embodiments, for the communication negotiation process of the MBS service between the policy control function entity and the AF entity, reference may be made to the technical solutions of the foregoing embodiments and are not repeated.

Step S520: Transmit the MBS service status indication information to the AF entity based on the transmission policy to indicate the AF entity to transmit MBS service data matching the MBS service status indication information to a core network element according to the MBS service status indication information.

In some embodiments, the MBS service status indication information is used for indicating an MBS service status. A transmission status, a processing status, and the like of the MBS service may be learned according to the MBS service status indication information. For example, the MBS service status indication information may be a real-time status of a PDU session for processing the MBS service, and network status information related to the processing of the MBS service.

The implementation details of the technical solutions of the embodiments of this application are described from the perspective of the AF and the SMF respectively. An interaction process between entities is described in detail below with reference to FIG. 6 to FIG. 9.

In the embodiments of this application, negotiation of the MBS service may be performed between the AF and the 5G network. According to the transmission policy generated through the negotiation, the 5GC (5G core) transmits related status information that may affect the MBS service to the AF, to resolve the problem of invalid data transmission caused by the lack of related status information in the application layer of the 5G MBS service (especially the broadcast service).

In some embodiments, the 5GC may transmit the PDU session related status information, the network status information, and the like related to the MBS service to the AF. Descriptions are provided below respectively.

As shown in FIG. 6, according to some embodiments of this application, the process of transmitting the PDU session related status information to the AF includes the following steps:

Step S610: The AF negotiates a policy with a 5GC network element and subscribes to the 5GC for a service.

Figure 7:
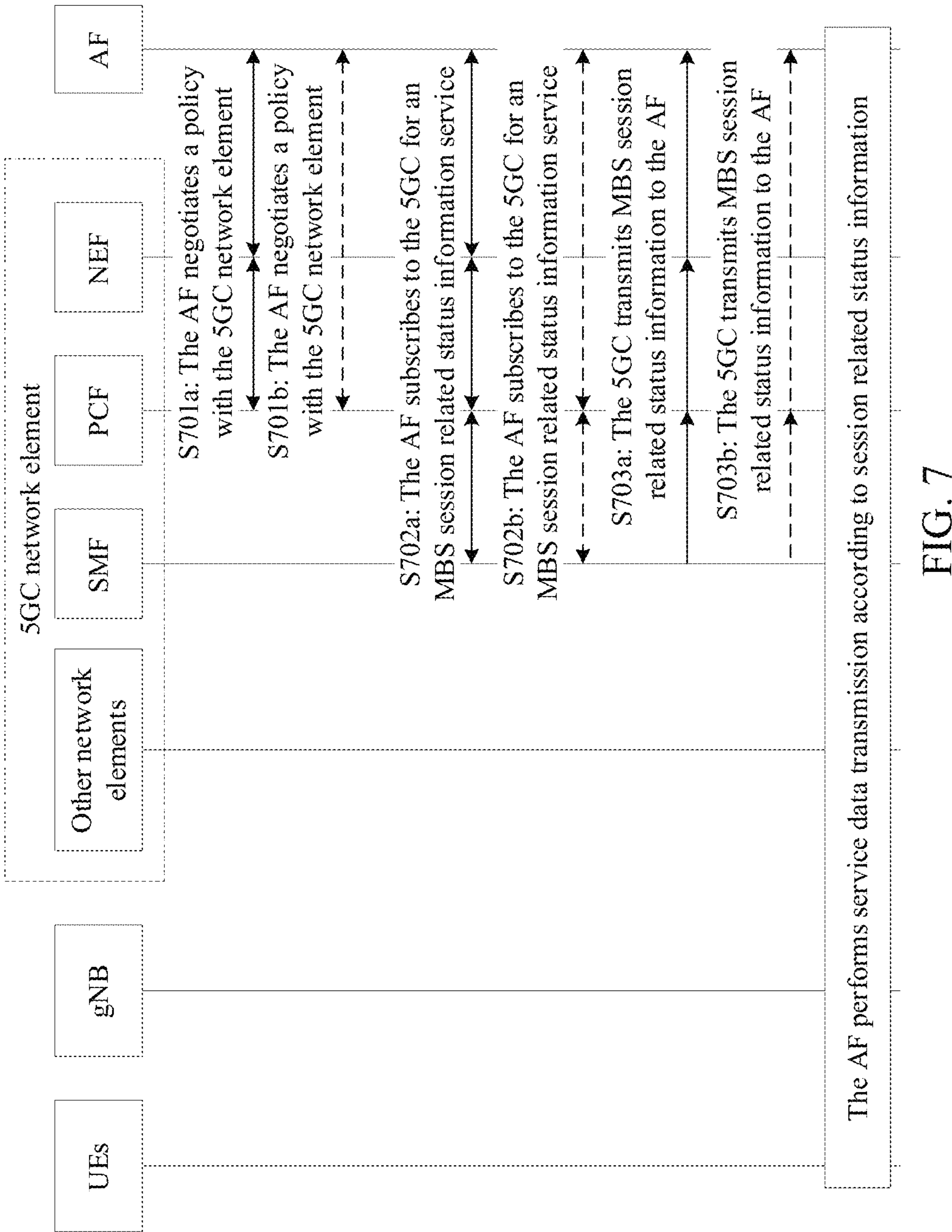
FIG. 7 is a schematic diagram of an interaction process between an AF and a 5GC network element according to some embodiments of this application.

Specifically, as shown in FIG. 7, the negotiation process between the AF and the 5GC network element may be performed by step S701*a*, or may be performed by step S701*b*. In step S701*a*, the AF may negotiate a transmission policy with the PCF through the NEF. In step S701*b*, the AF may negotiate a transmission policy directly with the PCF.

The process of the AF subscribing to the 5GC for a service may be performed by step S702*a*, or may be performed by step S702*b*. In step S702*a*, the AF may interact with the SMF through the NEF and the PCF. For example, the AF transmits a subscription service for MBS session related status information to the SMF through the NEF and the PCF, and then the SMF returns subscription response information to the AF through the PCF and the NEF. In step S702*b*, the AF may directly interact with the SMF through the PCF. For example, the AF transmits a subscription service for MBS session related status information to the SMF through the PCF, and then the SMF returns subscription response information to the AF through the PCF.

Step S620: The 5GC transmits PDU session related status information to the AF.

Specifically, as shown in FIG. 7, the process of the 5GC transmitting the PDU session related status information to the AF may be performed by step S703*a*, or may be performed by step S703*b*. In step S703*a*, the SMF transmits the MBS session related status information to the AF through the PCF and the NEF. In step S703*b*, the SMF transmits the MBS session related status information directly to the AF through the PCF.

Step S630: The AF performs service data transmission with the 5GC.

In the embodiments shown in FIG. 6 and FIG. 7, the problem of invalid data transmission caused by the AF lacking real-time PDU session related status information can be resolved by transmitting the PDU session related status information to the AF.

As shown in FIG. 8, according to some embodiments of this application, the process of transmitting the network status information to the AF includes the following steps:

Step S810: The AF negotiates a policy with a 5GC network element and subscribes to the 5GC for a service.

Figure 9:
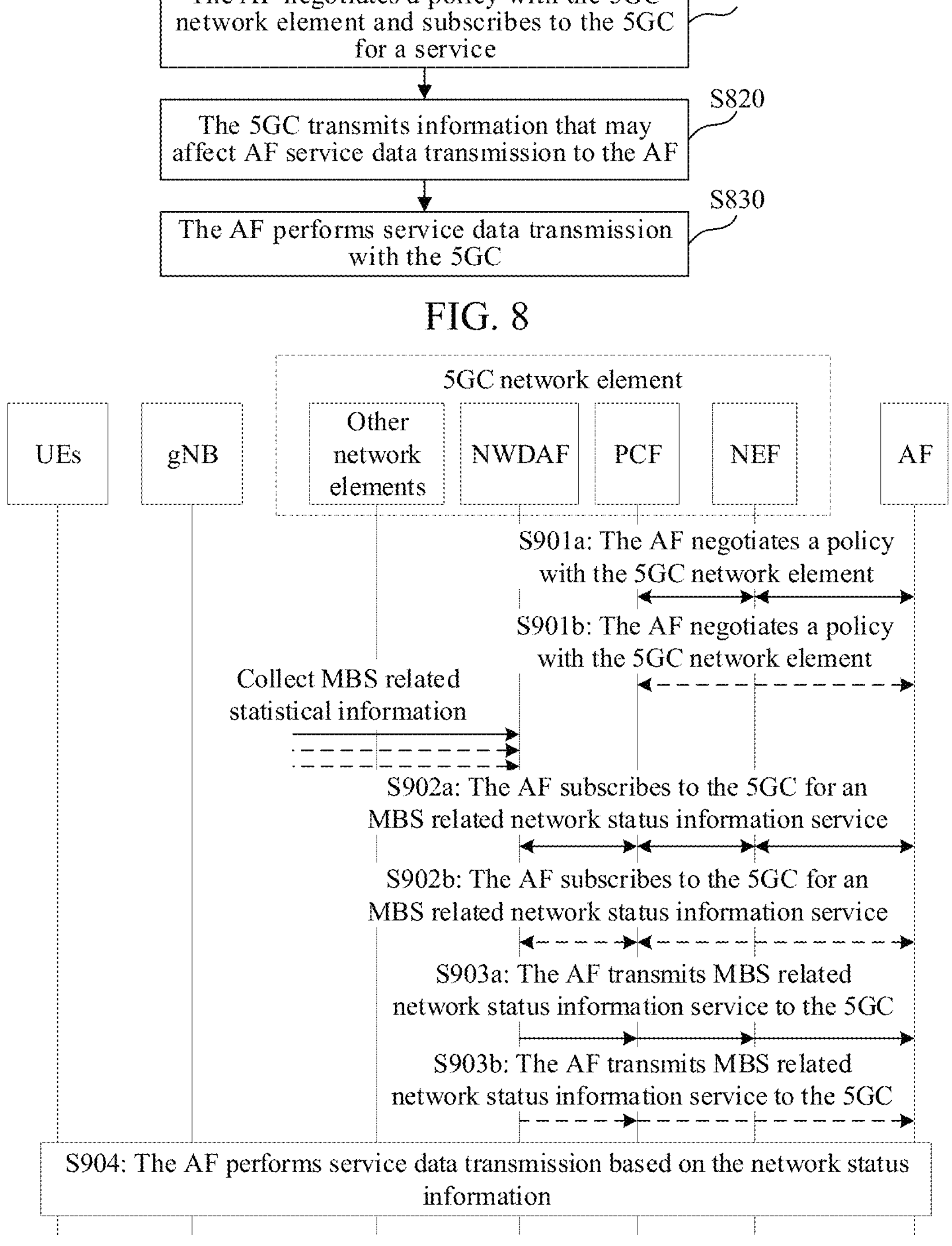
FIG. 9 is a schematic diagram of an interaction process between an AF and a 5GC network element according to some embodiments of this application.

Specifically, as shown in FIG. 9, the negotiation process between the AF and the 5GC network element may be performed by step S901*a*, or may be performed by step S901*b*. In step S901*a*, the AF may negotiate a transmission policy with the PCF through the NEF. In step S901*b*, the AF may negotiate a transmission policy directly with the PCF.

In this embodiment, an NWDAF (Network Data Analytics Function) may be enhanced to collect and analyze MBS related statistical information, such as (R)AN physical layer broadcast resource information, an MB-UPF available bandwidth, and a transmission delay. The collection process may be ongoing or started after the AF has subscribed.

The process of the AF to the 5GC subscription service may be performed through step S902*a*, or may be performed by step S902*b*. In step S902*a*, the AF may interact with the NWDAF through the NEF and the PCF. For example, the AF transmits a subscription service for MBS related network status information to the NWDAF through the NEF and the PCF, and then the NWDAF returns subscription response information to the AF through the PCF and the NEF; In step S902*b*, the AF may directly interact with the NWDAF through the PCF. For example, the AF transmits a subscription service for MBS related network status information to the NWDAF through the PCF, and then the NWDAF returns subscription response information to the AF through the PCF.

Step S820: The 5GC transmits network status information that may affect AF service data transmission to the AF.

Specifically, as shown in FIG. 9, the process of the 5GC transmitting the network status information to the AF may be performed by step S903*a*, or may be performed by step S903*b*. In step S903*a*, the NWDAF transmits MBS related network status information to the AF through the PCF and the NEF. In step S903*b*, the NWDAF transmits MBS related network status information directly to the AF through the PCF.

Step S830: The AF performs service data transmission with the 5GC.

In the embodiments shown in FIG. 8 and FIG. 9, the problem of invalid data transmission caused by the AF lacking the MBS related network status information can be resolved by transmitting the MBS related network status information to the AF.

In summary, with the technical solutions of the embodiments of this application, the AF can obtain related information of the MBS service status from the core network side, and can transmit the matching MBS service data to the core network element accordingly, to avoid the problem of invalid service data transmission caused by the AF blindly transmitting the MBS service data to the core network element, thereby improving the transmission efficiency of the MBS service data.

The following describes the apparatus embodiments of this application, and the apparatus embodiments may be used for performing the communication method for a multicast and broadcast service in the foregoing embodiments of this application. For details not disclosed in the apparatus embodiments of this application, reference may be made to the foregoing embodiments of the communication method for a multicast and broadcast service of this application.

Figure 10:
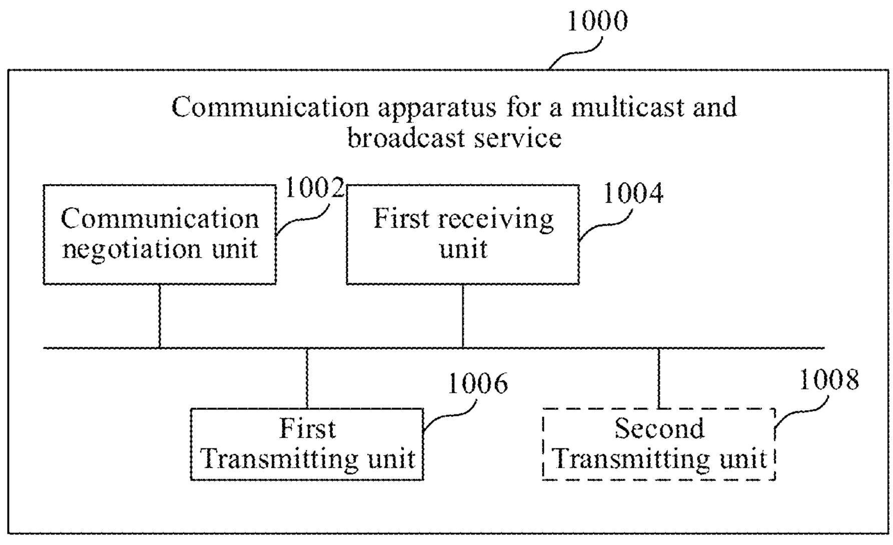
FIG. 10 is a block diagram of a communication apparatus for a multicast and broadcast service according to some embodiments of this application.

FIG. 10 is a block diagram of a communication apparatus for a multicast and broadcast service according to some embodiments of this application. The communication apparatus may be disposed in an AF.

Referring to FIG. 10, the communication apparatus 1000 for a multicast and broadcast service according to some embodiments of this application includes: a communication negotiation unit 1002, a first receiving unit 1004, and a first transmitting unit 1006.

The communication negotiation unit 1002 is configured to perform communication negotiation of an MBS service with a core network element to determine a transmission policy of MBS service status indication information. The first receiving unit 1004 is configured to receive, based on the transmission policy, the MBS service status indication information transmitted by the core network element. The first transmitting unit 1006 is configured to transmit MBS service data matching the MBS service status indication information to the core network element according to the MBS service status indication information, so that the core network element transmits the MBS service data to a terminal device.

In some embodiments of this application, based on the foregoing solution, the core network element includes a policy control function entity. The communication negotiation unit 1002 is configured to perform the communication negotiation of the MBS service with the policy control function entity through a network exposure function entity; or perform the communication negotiation of the MBS service directly with the policy control function entity.

In some embodiments of this application, based on the foregoing solution, the communication apparatus 1000 for a multicast and broadcast service further includes:

a second transmitting unit 1008, configured to transmit a subscription request for the MBS service status indication information to the core network element before the MBS service status indication information transmitted by the core network element is received.

In some embodiments of this application, based on the foregoing solution, the first receiving unit 1004 is configured to receive the MBS service status indication information transmitted by the core network element after receiving a subscription response returned by the core network element for the subscription request.

In some embodiments of this application, based on the foregoing solution, the core network element includes a network exposure function entity, a policy control function entity, and a session management function entity. The session management function entity is used for generating the MBS service status indication information. The second transmitting unit 1008 is configured to transmit the subscription request for the MBS service status indication information to the network exposure function entity, so that the network exposure function entity transmits the subscription request to the session management function entity through the policy control function entity; or transmit the subscription request for the MBS service status indication information to the policy control function entity, so that the policy control function entity forwards the subscription request to the session management function entity.

In some embodiments of this application, based on the foregoing solution, the first receiving unit 1004 is configured to: receive the MBS service status indication information forwarded from the session management function entity by the network exposure function entity, where the MBS service status indication information is forwarded from the policy control function entity to the network exposure function entity; or receive the MBS service status indication information forwarded from the session management function entity by the policy control function entity.

In some embodiments of this application, based on the foregoing solution, the transmission policy of the MBS service status indication information includes at least one of the following:

an information type included in the MBS service status indication information, to-be-negotiated information content included in the MBS service status indication information, and a transmission frequency of the MBS service status indication information.

In some embodiments of this application, based on the foregoing solution, the information type of the MBS service status indication information includes at least one of the following:

a real-time status of a PDU session for processing the MBS service, and network status information related to the processing of the MBS service.

In some embodiments of this application, based on the foregoing solution, when the information type included in the MBS service status indication information is the real-time status of the PDU session for processing the MBS service, and the to-be-negotiated information content includes one or more of the following: whether the PDU session is established, whether the PDU session is active.

When the information type included in the MBS service status indication information is the network status information related to the processing of the MBS service, the to-be-negotiated information content comprises at least one of the following:

physical layer broadcast resource information of an access network, an available bandwidth of a user plane function entity for processing the MBS service, and a transmission delay of the user plane function entity for processing the MBS service.

In some embodiments of this application, based on the foregoing solution, the first transmitting unit 1006 is configured to:

suspending transmitting the MBS service data when the MBS service status indication information indicates that the PDU session for processing the MBS service has been released or has not been established;

transmitting the MBS service data normally when the MBS service status indication information indicates that a network status related to the processing of the MBS service meets a quality of service requirement of the MBS service;

reducing the to-be-transmitted MBS service data when the MBS service status indication information indicates that the network status related to the processing of the MBS service does not meet the quality of service requirement of the MBS service.

Figure 11:
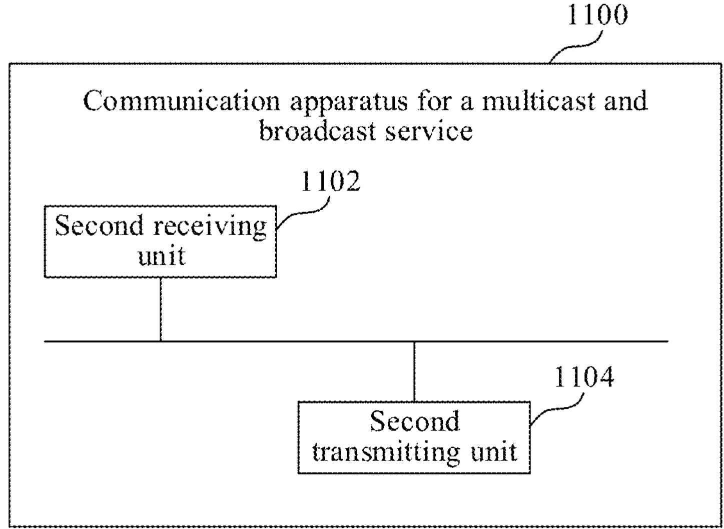
FIG. 11 is a block diagram of a communication apparatus for a multicast and broadcast service according to some embodiments of this application.

FIG. 11 is a block diagram of a communication apparatus for a multicast and broadcast service according to some embodiments of this application. The communication apparatus may be disposed in a core network element, for example, in an SMF.

Referring to FIG. 11, the communication apparatus 1100 for a multicast and broadcast service according to some embodiments of this application includes: a second receiving unit 1102 and a second transmitting unit 1104.

The second receiving unit 1102 is configured to receive a transmission policy of MBS service status indication information transmitted by a policy control function entity, the transmission policy being determined by the policy control function entity by performing communication negotiation of an MBS service with an AF entity. The second transmitting unit 1104 is configured to transmit the MBS service status indication information to the AF entity based on the transmission policy to indicate the AF entity to transmit MBS service data matching the MBS service status indication information to a core network element according to the MBS service status indication information.

Figure 12:
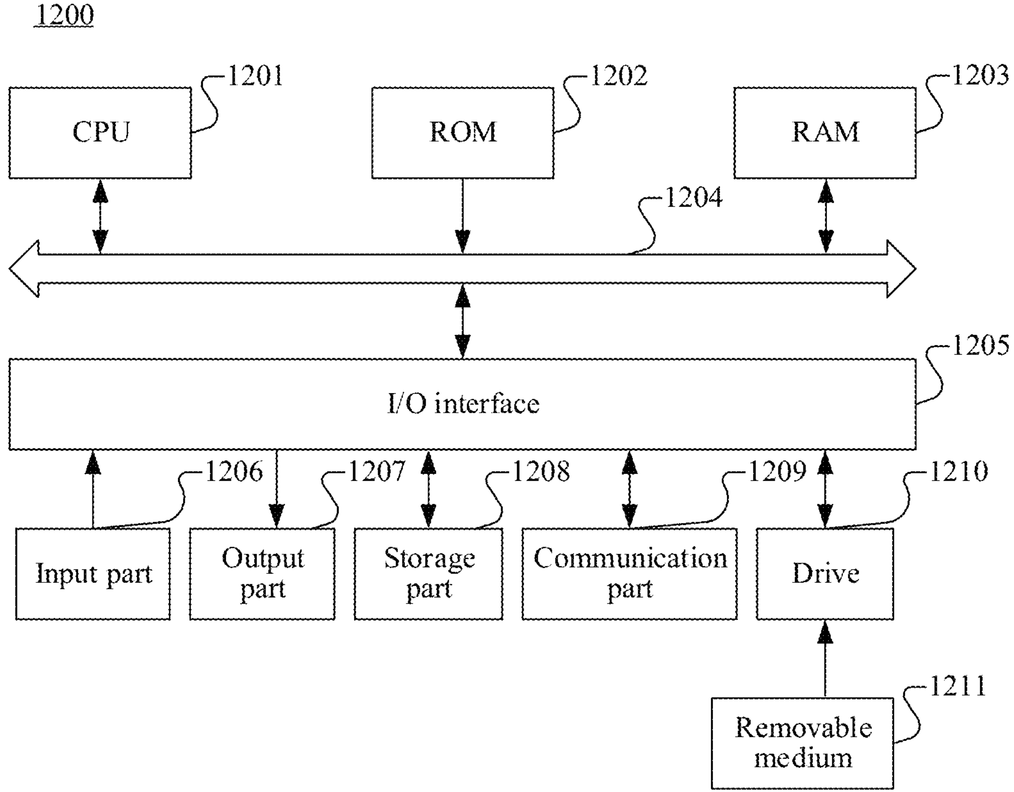
FIG. 12 is a schematic structural diagram of a computer system of an electronic device adapted to implement the embodiments of this application.

FIG. 12 is a schematic structural diagram of a computer system of an electronic device adapted to implement the embodiments of this application.

The computer system 1200 of the electronic device shown in FIG. 12 is merely an example, and does not constitute any limitation on functions and use ranges of the embodiments of this application.

As shown in FIG. 12, the computer system 1200 includes a central processing unit (CPU) 1201, which may execute various appropriate actions and processing according to a program stored in a read-only memory (ROM) 1202 or a program loaded from a storage part 1208 to a random access memory (RAM) 1203, for example, perform the method described in the foregoing embodiments. The RAM 1203 further stores various programs and data required by an operating system. The CPU 1201, the ROM 1202, and the RAM 1203 are connected to each other through a bus 1204. An input/output (I/O) interface 1205 is also connected to the bus 1204.

The following components are connected to the I/O interface 1205: an input part 1206 including a keyboard, a mouse, or the like; an output part 1207 including a cathode ray tube (CRT), a liquid crystal display (LCD), a speaker, or the like; a storage part 1208 including a hard disk, or the like; and a communication part 1209 including a network interface card such as a local area network (LAN) card, a modem, or the like. The communication part 1209 performs communication processing by using a network such as the Internet. A drive 1210 is also connected to the I/O interface 1205 as required. A removable medium 1211, such as a magnetic disk, an optical disc, a magneto-optical disk, or a semiconductor memory, is mounted on the drive 1210 as required, so that a computer program read from the removable medium is installed into the storage part 1208 as required.

Particularly, according to an embodiment of this application, the processes described above by referring to the flowcharts may be implemented as computer software programs. For example, an embodiment of this application includes a computer program product. The computer program product includes a computer program stored in a non-transitory computer-readable medium. The computer program includes a computer program used for performing a method shown in the flowchart. In such an embodiment, the computer program may be downloaded and installed through the communication part 1209 from a network, and/or installed from the removable medium 1211. When the computer program is executed by the CPU 1201, the various functions defined in the system of this application are executed.

The computer-readable medium shown in the embodiments of this application may be a computer-readable signal medium or a computer-readable storage medium or any combination thereof. The computer-readable storage medium may be, for example, but is not limited to, an electrical, magnetic, optical, electromagnetic, infrared, or semiconductor system, apparatus, or device, or any combination thereof. A more specific example of the computer-readable storage medium may include but is not limited to: an electrical connection having one or more wires, a portable computer magnetic disk, a hard disk, a random access memory (RAM), a read-only memory (ROM), an erasable programmable read-only memory (EPROM), a flash memory, an optical fiber, a compact disk read-only memory (CD-ROM), an optical storage device, a magnetic storage device, or any appropriate combination thereof. In this application, the computer-readable storage medium may be any tangible medium containing or storing a program, and the program may be used by or used in combination with an instruction execution system, an apparatus, or a device. In this application, a computer-readable signal medium may include a data signal in a baseband or propagated as a part of a carrier wave, the data signal carrying a computer-readable computer program. A data signal propagated in such a way may assume a plurality of forms, including, but not limited to, an electromagnetic signal, an optical signal, or any appropriate combination thereof. The computer-readable signal medium may be further any computer-readable medium in addition to a computer-readable storage medium. The computer-readable medium may send, propagate, or transmit a program that is used by or used in combination with an instruction execution system, apparatus, or device. The computer program comprised in the computer-readable medium may be transmitted by using any suitable medium, comprising but not limited to: a wireless medium, a wire, or the like, or any suitable combination thereof.

The flowcharts and block diagrams in the accompanying drawings illustrate possible system architectures, functions, and operations that may be implemented by a system, a method, and a computer program product according to various embodiments of this application. Each box in a flowchart or a block diagram may represent a module, a program segment, or a part of code. The module, the program segment, or the part of code includes one or more executable instructions used for implementing designated logic functions. In some implementations used as substitutes, functions annotated in boxes may alternatively occur in a sequence different from that annotated in an accompanying drawing. For example, actually two boxes shown in succession may be performed basically in parallel, and sometimes the two boxes may be performed in a reverse sequence. This is determined by a related function. Each box in the block diagram or the flowchart, and a combination of blocks in the block diagram or the flowchart may be implemented by using a dedicated hardware-based system that performs a specified function or operation, or may be implemented by using a combination of dedicated hardware and computer instructions.

Related units described in the embodiments of this application may be implemented in a software manner, or may be implemented in a hardware manner, and the unit described can also be set in a processor. Names of the units do not constitute a limitation on the units in a specific case.

In another aspect, this application further provides a computer readable medium. The computer readable medium may be included in the electronic device described in the above embodiments, or may exist along without being assembled into the electronic device. The computer-readable medium carries one or more programs, the one or more programs, when executed by the electronic device, causing the electronic device to implement the method described in the foregoing embodiments.

Although a plurality of modules or units of a device configured to perform actions are discussed in the foregoing detailed description, such division is not mandatory. Actually, according to the implementations of this application, the features and functions of two or more modules or units described above may be specified in one module or unit. Conversely, features and functions of one module or unit described above may be further divided into a plurality of modules or units for implementation.

Through the descriptions of the foregoing implementations, a person skilled in the art easily understands that the exemplary implementations described herein may be implemented through software, or may be implemented through software located in combination with necessary hardware. Therefore, the technical solutions of the embodiments of this application may be implemented in a form of a software product. The software product may be stored in a non-volatile storage medium (which may be a CD-ROM, a USB flash drive, a removable hard disk, or the like) or on the network, including several instructions for instructing a computing device (which may be a personal computer, a server, a touch terminal, a network device, or the like) to perform the methods according to the embodiments of this application.

After considering the specification and practicing the disclosed embodiments, a person skilled in the art may easily conceive of other implementations of this application. This application is intended to cover any variations, uses or adaptive changes of this application. Such variations, uses or adaptive changes follow the general principles of this application, and include well-known knowledge and conventional technical means in the art that are not disclosed in this application. In this application, the term “module” or “unit” in this application refers to a computer program or part of the computer program that has a predefined function and works together with other related parts to achieve a predefined goal and may be all or partially implemented by using software, hardware (e.g., processing circuitry and/or memory configured to perform the predefined functions), or a combination thereof. Each module or unit can be implemented using one or more processors (or processors and memory). Likewise, a processor (or processors and memory) can be used to implement one or more modules or units. Moreover, each module or unit can be part of an overall module or unit that includes the functionalities of the module or unit.

It is to be understood that this application is not limited to the precise structures described above and shown in the accompanying drawings, and various modifications and changes can be made without departing from the scope of this application. The scope of this application is limited by the appended claims only.

What is claimed is:

1. A communication method for a multicast and broadcast service performed by an electronic device acting as an Application Function (AF) entity, the method comprising:

performing communication negotiation of a Multicast and Broadcast Service (MBS) service with a core network element, to determine a transmission policy of MBS service status indication information;

receiving, based on the transmission policy, the MBS service status indication information transmitted by the core network element; and transmitting MBS service data matching the MBS service status indication information to the core network element, wherein the core network element transmits the MBS service data to a terminal device and the MBS service data includes MBS content transmitted to the terminal device, further including:

suspending transmitting the MBS service data when the MBS service status indication information indicates that the PDU session for processing the MBS service has been released or has not been established;

transmitting the MBS service data normally when the MBS service status indication information indicates that a network status related to the processing of the MBS service meets a quality of service requirement of the MBS service; and reducing the to-be-transmitted MBS service data when the MBS service status indication information indicates that the network status related to the processing of the MBS service does not meet the quality of service requirement of the MBS service.

2. The method according to claim 1, wherein the core network element comprises a policy control function entity; and the performing communication negotiation of a Multicast and Broadcast Service (MBS) service with a core network element comprises:

performing the communication negotiation of the MBS service with the policy control function entity through a network exposure function entity; or performing the communication negotiation of the MBS service directly with the policy control function entity.

3. The method according to claim 1, further comprising:

transmitting a subscription request for the MBS service status indication information to the core network element before receiving the MBS service status indication information transmitted by the core network element.

4. The method according to claim 3, wherein the receiving the MBS service status indication information transmitted by the core network element comprises:

receiving the MBS service status indication information transmitted by the core network element after receiving a subscription response returned by the core network element for the subscription request.

5. The method according to claim 1, wherein the core network element comprises a network exposure function entity, a policy control function entity, and a session management function entity; the session management function entity is used for generating the MBS service status indication information; and the receiving the MBS service status indication information transmitted by the core network element comprises:

receiving the MBS service status indication information forwarded from the session management function entity by the network exposure function entity, wherein the MBS service status indication information is forwarded from the policy control function entity to the network exposure function entity; or receiving the MBS service status indication information forwarded from the session management function entity by the policy control function entity.

6. The method according to claim 1 wherein the transmission policy of the MBS service status indication information comprises at least one of the following:

an information type comprised in the MBS service status indication information, to-be-negotiated information content comprised in the MBS service status indication information, and a transmission frequency of the MBS service status indication information.

7. An electronic device acting as an Application Function (AF) entity, comprising:

one or more processors;

a storage apparatus, configured to store one or more programs, the one or more programs, when executed by the one or more processors, causing the electronic device to implement a communication method for a multicast and broadcast service including:

performing communication negotiation of a Multicast and Broadcast Service (MBS) service with a core network element, to determine a transmission policy of MBS service status indication information;

receiving, based on the transmission policy, the MBS service status indication information transmitted by the core network element; and transmitting MBS service data matching the MBS service status indication information to the core network element, wherein the core network element transmits the MBS service data to a terminal device and the MBS service data includes MBS content transmitted to the terminal device, further including:

suspending transmitting the MBS service data when the MBS service status indication information indicates that the PDU session for processing the MBS service has been released or has not been established;

transmitting the MBS service data normally when the MBS service status indication information indicates that a network status related to the processing of the MBS service meets a quality of service requirement of the MBS service; and reducing the to-be-transmitted MBS service data when the MBS service status indication information indicates that the network status related to the processing of the MBS service does not meet the quality of service requirement of the MBS service.

8. The electronic device according to claim 7, wherein the core network element comprises a policy control function entity; and the performing communication negotiation of a Multicast and Broadcast Service (MBS) service with a core network element comprises:

performing the communication negotiation of the MBS service with the policy control function entity through a network exposure function entity; or performing the communication negotiation of the MBS service directly with the policy control function entity.

9. The electronic device according to claim 7, wherein the method further comprises:

transmitting a subscription request for the MBS service status indication information to the core network element before receiving the MBS service status indication information transmitted by the core network element.

10. The electronic device according to claim 9, wherein the receiving the MBS service status indication information transmitted by the core network element comprises:

receiving the MBS service status indication information transmitted by the core network element after receiving a subscription response returned by the core network element for the subscription request.

11. The electronic device according to claim 7, wherein the core network element comprises a network exposure function entity, a policy control function entity, and a session management function entity; the session management function entity is used for generating the MBS service status indication information; and the receiving the MBS service status indication information transmitted by the core network element comprises:

receiving the MBS service status indication information forwarded from the session management function entity by the network exposure function entity, wherein the MBS service status indication information is forwarded from the policy control function entity to the network exposure function entity; or receiving the MBS service status indication information forwarded from the session management function entity by the policy control function entity.

12. The electronic device according to claim 7, wherein the transmission policy of the MBS service status indication information comprises at least one of the following:

an information type comprised in the MBS service status indication information, to-be-negotiated information content comprised in the MBS service status indication information, and a transmission frequency of the MBS service status indication information.

13. A non-transitory computer-readable medium, storing one or more computer programs, the computer program, when executed by one or more processors of an electronic device acting as an Application Function (AF) entity, causing the electronic device to implement a communication method for a multicast and broadcast service including:

performing communication negotiation of a Multicast and Broadcast Service (MBS) service with a core network element, to determine a transmission policy of MBS service status indication information;

receiving, based on the transmission policy, the MBS service status indication information transmitted by the core network element; and transmitting MBS service data matching the MBS service status indication information to the core network element, wherein the core network element transmits the MBS service data to a terminal device and the MBS service data includes MBS content transmitted to the terminal device, further including:

suspending transmitting the MBS service data when the MBS service status indication information indicates that the PDU session for processing the MBS service has been released or has not been established;

transmitting the MBS service data normally when the MBS service status indication information indicates that a network status related to the processing of the MBS service meets a quality of service requirement of the MBS service; and reducing the to-be-transmitted MBS service data when the MBS service status indication information indicates that the network status related to the processing of the MBS service does not meet the quality of service requirement of the MBS service.

14. The non-transitory computer-readable medium according to claim 13, wherein the core network element comprises a policy control function entity; and the performing communication negotiation of a Multicast and Broadcast Service (MBS) service with a core network element comprises:

performing the communication negotiation of the MBS service with the policy control function entity through a network exposure function entity; or performing the communication negotiation of the MBS service directly with the policy control function entity.

15. The non-transitory computer-readable medium according to claim 13, wherein the method further comprises:

transmitting a subscription request for the MBS service status indication information to the core network element before receiving the MBS service status indication information transmitted by the core network element.

16. The non-transitory computer-readable medium according to claim 13, wherein the core network element comprises a network exposure function entity, a policy control function entity, and a session management function entity; the session management function entity is used for generating the MBS service status indication information; and the receiving the MBS service status indication information transmitted by the core network element comprises:

receiving the MBS service status indication information forwarded from the session management function entity by the network exposure function entity, wherein the MBS service status indication information is forwarded from the policy control function entity to the network exposure function entity; or receiving the MBS service status indication information forwarded from the session management function entity by the policy control function entity.

17. The non-transitory computer-readable medium according to claim 13, wherein the transmission policy of the MBS service status indication information comprises at least one of the following:

an information type comprised in the MBS service status indication information, to-be-negotiated information content comprised in the MBS service status indication information, and a transmission frequency of the MBS service status indication information.

* * * * *